United States Patent [19]

Apsell et al.

[11] 3,846,783

[45] Nov. 5, 1974

[54] REMOTE PAGING WITH MESSAGE STORAGE

[75] Inventors: Sheldon P. Apsell, Nahant; Olof C. Johnson, Jr., Chelmsford; Robert W. Whitney, Burlington, all of Mass.

[73] Assignee: Eikonix Corporation, Burlington, Mass.

[22] Filed: Mar. 12, 1973

[21] Appl. No.: 340,225

[52] U.S. Cl. 340/311, 325/55, 325/64
[51] Int. Cl. H04m 11/02
[58] Field of Search 340/311, 147 R, 147 F, 340/150, 171 R, 171 PF; 325/55, 56, 64

[56] References Cited

UNITED STATES PATENTS

| | | | |
|---|---|---|---|
| 3,314,051 | 4/1967 | Willcox et al. | 325/55 |
| 3,378,817 | 4/1968 | Vitt | 325/64 |
| 3,510,777 | 5/1970 | Gordon | 340/167 R |
| 3,513,399 | 5/1970 | Wycoff | 325/55 |
| 3,678,391 | 7/1972 | Gough | 325/55 |

*Primary Examiner*—John W. Caldwell
*Assistant Examiner*—Richard P. Lange
*Attorney, Agent, or Firm*—Charles Hieken, Esq.; Jerry Cohen, Esq.

[57] ABSTRACT

A message for a designated recipient is encoded by audio tones modulating a radio frequency carrier. A lightweight personal receiver carried by the designated recipient receives the carrier signal, demodulates the tones, decodes the designating address code, decodes the message only if the address code designates it for that recipient and prints out the message.

25 Claims, 5 Drawing Figures

REMOTE PAGING WITH MESSAGE STORAGE

BACKGROUND OF THE INVENTION

The present invention relates in general to remote paging and more particularly concerns novel apparatus and techniques for reliably conveying messages to people who are difficult to reach without disturbing the recipient when a message is transmitted while allowing the recipient to read the message when convenient for him. A feature of the invention is the provision of hard copy of the message from a personally transportable receiver that is compact, reliable, light enough to be carried by individuals and arranged to consume relatively little power to allow for active monitoring for messages over relatively long intervals without replacing or recharging batteries.

Doctors, repair men and others often move about so that it is difficult to locate them for a new or more urgent assignment promptly or otherwise transmit a message to them. Accordingly, many such people now carry personally transportable paging receivers. One typical prior art personally transportable paging receiver includes tone filters for detecting a combination of tones unique to the receiver. To contact the person carrying the receiver, an operator actuates controls that effect modulation of a carrier with the designated tone combination on a carrier frequency to which all receivers associated with a particular system are tuned. Upon detecting the combination of tones, the receiver emits an audio beep, signaling the recipient to telephone a central message center for the actual message.

According to another type of prior art system, the beep is followed by a voice message. For example, the recipient may be instructed to call a particular telephone number of proceed to a particular location. If the resipient is unable to understand the voice message, he must telephone the message center for a repeat.

Accordingly, it is an important object of this invention to provide an improved paging system which overcomes one or more of the disadvantages enumerated above.

It is an important object of this invention to provide a paging system in which the recipient of a message may review the message at his convenience.

It is a further object of the invention to achieve one or more of the preceding objects with a lightweight personally transportable receiver that carries a record of a received message.

It is a further object of the invention to achieve one or more of the preceding objects while providing hard copy.

SUMMARY OF THE INVENTION

According to the invention, there is a source of binarily encoded address and message signals carried by audio tones, a source of a radio frequency carrier signal, and means for modulating the carrier signal with the tones. A personally transportable reciever carried by the person to be paged includes means for detecting the audio tones, means for decoding the address signals carried by the detected tones, means for decoding the message signals carried by the detected tones only if the detected address signals coincide with a predetermined receiver address designated by a source of receiver address signal in the receiver, and means for storing the decoded message signals for visible review by the intended recipient. The means for storing preferably comprises means, such as a thermal printer, for providing a hard copy of the received message.

According to one aspect of the invention there are first, second and third tones of different frequencies for carrying timing data, and inverse data signals, respectively. The inverse data signals correspond to the complement of the data signals carried by the second tone. A sequence of address bits designating the intended recipient are transmitted before the message bits. The receiver includes means for comparing the received address bits with bits from a source of receiver address signals identifying the particular receiver to enable reception of the following message bits when identity occurs. Means for printing or otherwise storing the received message bits are then enabled so that the recipient may review the message at his convenience without necessarily being disturbed by a beep, voice message or other annoying sounds. According to another feature of the invention an end-of-message code is transmitted, and the receiver includes means for detecting the end-of-message code for then disabling the means for printing or otherwise storing so that future messages not intended for that recipient will not be printed or otherwise stored in that receiver.

Numerous other features, objects and advantages of the invention will become apparent from the following specification when read in connection with the accompanying drawing in which:

DETAILED DESCRIPTION OF PREFERRED EMBODIMENTS

Figure 1:
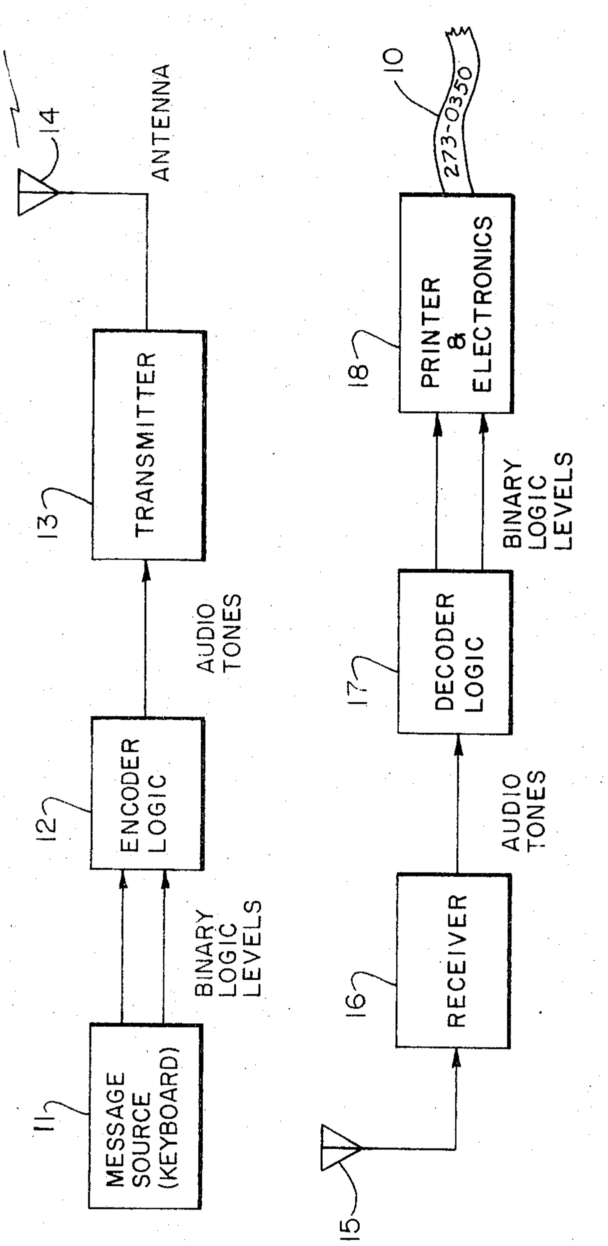
FIG. 1 is a block diagram illustrating the logical arrangement of a system according to the invention.

With reference now to the drawing and more particularly FIG. 1 thereof, there is shown a block diagram illustrating the logical arrangement of a system according to the invention in which a message entered at message source 11 is printed upon a tape 10 at a small personal receiver carried by an intended recipient. Message source 11, typically a keyboard, provides binary logic levels to encoder logic 12 that provides a corresponding sequence of audio tones for modulating transmitter 13, preferably by frequency modulation, to radiate an f-m signal from antenna 14 carrying the audio tones with the digitally encoded information.

Receiving antenna 15 receives the transmitted energy and delivers it to receiver 16, which may be of conventional design. Receiver 16 includes the usual circuits for detecting the modulation and delivering the audio tones carrying the digital data to decoder logic 17 which provides the two binary logic levels to the printer and associated electronics 18 to produce a hard copy of the transmitted message. The message may be, for example, a telephone number, as indicated in FIG. 1, which the recipient should call.

This basic system just described has a number of advantages. Unlike the "beep-only" system, the recipient receives an actual message. Even if the system were to convey only telephone numbers to call in a system without letters, the recipient could be directed to call any telephone number instead of being limited to first phoning the message center for the telephone number to be called. Furthermore, the recipient has a record of the message and need not be subject to the annoyance of being unable to record or comprehend a spoken message. Furthermore, there need be no distracting beep. The soft chattering of the printer may be adequate to inform the recipient that a message has arrived for review at his convenience.

Where convenient, corresponding elements are designated by the same reference symbol throughout the drawing. And since specific circuits for carrying out the functions of the apparatus in the block diagrams are conventional and well known in the art, details of this circuitry are omitted to avoid obscuring the principles of the invention. Specific embodiments have been illustrated and described herein in a manner so as to enable anyone having ordinary skill in the art to practice the invention.

Figure 2:
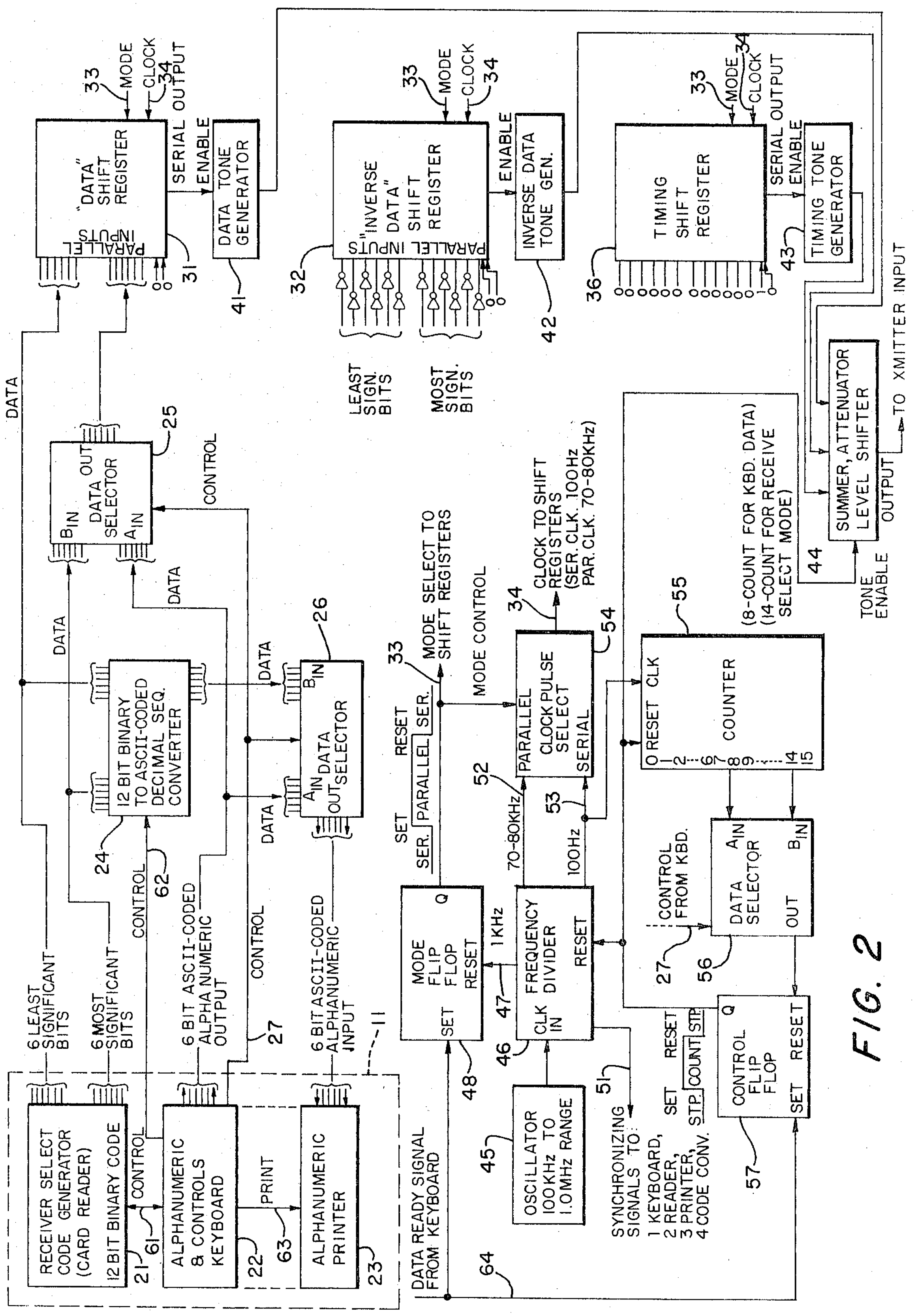
FIG. 2 is a block diagram illustrating the logical arrangement of the means for providing the audio tones with encoded information to the transmitter according to a preferred form of the invention.

With reference to FIG. 2, there is shown a block diagram of a preferred means for converting message and address data into the tones for modulating transmitter 13. Message source 11 typically comprises a receiver-select code generator 21, such as a card reader, for providing an address signal designating the intended recipient, an alphanumeric and controls keyboard 22 for entering a message and initiating transmission and an alphanumeric printer 23 for printing out each address and each following message at the message center for keeping a log of all messages sent. Keyboard 22 and printer 23 are conventional. Receiver select code generator 21 also may be any conventional piece of equipment for providing a designated address. For example, it could be an ordinary Hollerith card reader, optical character reader or other device suitable for reading a card identifying the designated recipient or recipients.

Preferably keyboard 22 includes keys for 64 symbols, including the capital letters of the English alphabet, the digits from 0 (zero) to 9, and various other symbols, and for various control functions such as "START RECEIVER CODE," "START GROUP CALL," "END OF MESSAGE." It supplies a code for each of the 64 symbols according to a subset of the standardized ASCII symbol code; it activates via control signals the receiver-select code generator along with the various A/B data selectors described below and provides a data ready signal when either the receiver-select code signal or a message code is ready for transmission.

The remainder of the apparatus in FIG. 2 forms encoder logic 12 of FIG. 1. A 12-bit binary-to-ASCII-coded decimal sequence converter 24 converts a 12-bit binary number provided by receiver-select code generator 21 to the equivalent decimal number, sequences the digits and generates the appropriate 6-bit ASCII code for each digit for delivery to data selector 26. Data selectors 25 and 26 receive control signals from control line 27 of keyboard 22 to provide as an output either the A signal from keyboard 22 (usually the message) or the B signal from the receiver-select code generator 21. The six least significant bits from receiver-select code generator 21 are applied to the last six parallel input lines of data shift register 31 and inverse shift register 32. The first six parallel input lines of these registers receive the most significant bits from data selector 25. Each of these shift registers has a serial output for delivering the previously entered data in serial form. Each of these shift registers includes a mode input line connected to line 33 of the control system described below for selecting the parallel or serial mode and a clock input line for receiving clock pulses from line 34 of data selector 35 in the control system. Each of these shift registers accepts data from the parallel input when in the parallel mode in response to clock signals and shifts the data serially to the output terminal in response to clock signals when in the serial mode.

The data present at the parallel input terminals corresponds to the data bit signals provided by data selector 25 and receiver select code generator 21 for data register 31 and to the complement of such data for inverse data register 32, the two input lines nearest the output being always binary zero for reasons to be described below. The use of both data and inverse data registers provides redundancy helpful in avoiding errors with relatively little additional apparatus.

Structurally, timing shift register 36 is identical to shift registers 31 and 32; however, at the time data enters shift registers 31 and 32 in the parallel mode, timing shift register 33, also in the parallel mode, receives a ONE on the second parallel input line from the output and ZEROS on all other parallel input lines. When timing register 36 is shifted in synchronism with data and inverse data registers 31 and 32 in the serial mode, the ejected ONE on the serial output signifies that data bits follow commencing at the occurrence of the next serial clock pulse.

The occurrence of a ONE pulse from a register serial output enables a corresponding ONE of data tone generator 41, inverse data tone generator 42 and timing tone generator 43. By storing the digital data as indicated when the registers are in the parallel mode, registers 31 and 32 emit zeros for the first two serial clock pulse intervals while timing register 36 emits a ONE during the second serial clock pulse interval so that timing tone generator 43 is turned on to signify that during the next twelve clock pulse intervals data bit signals will occur. The initial binary ZERO in all shift registers insures that the timing discrepancy of the first serial shift clock pulse following parallel entry of data will not affect the width of the first timing pulse emitted.

The tone generators are typically audio oscillators enabled by a ONE, of frequency that does not vary appreciably when enabled or inhibited, typically in the range from 800 Hz to 2500 Hz. The outputs of tone generators 41, 42 and 43 are combined in summer, attenuator and level shifter 44, when enabled, to provide an output that is delivered to transmitter 13 suitable for modulating it.

Turning now to the control circuits, oscillator 45 is a stable oscillator typically having a frequency within the range 100 kHz to 1.0 MHz for energizing frequency divider 46. Divider 46 provides one output of typically one kHz on line 47 for delivery to the reset input of mode flip-flop 48 that is set by the data ready signal from keyboard 22 to provide the parallel mode designating signal on line 33 when set and the serial mode when reset. Frequency divider 46 also provides stable synchronizing signals typically within the range of 5–25 kHz on line 51 for delivery to keyboard 22, reader 21, printer 23 and converter 24. Frequency divider 46 further provides parallel clock pulses, typically occurring at a rate of 70–80 kHz, on line 52 and serial clock pulses at a 100 Hz rate on line 53 that are applied to clock pulse selector 54 for providing the parallel clock pulses on output line 34 when flip-flop 48 is set and serial clock pulses when the latter is reset.

Counter 55 has the designated numbered outputs such that a designated numbered line is enabled once for every 16 input pulses received from line 53 in the designated sequence for one serial clock pulse interval. Thus, line 8 is enabled on an 8 count when keyboard data is being processed and line 14 is enabled on a 14 count when receiver-select code data is being processed. Data selector 56 selects the appropriate one of these outputs for delivery to the reset input of control flip-flop 57 that is set by the data ready signal from keyboard 22 to provide on its output a COUNT signal when set and a RESET COUNTER signal when reset that enables and disables frequency divider 46 and counter 55 and summer, attenuator and level shifter 44 accordingly. The system is arranged so that the flip-flops do not receive set and reset signals simultaneously.

Having described the arrangement of the apparatus of FIG. 2, it is appropriate to consider its mode of operation. An operator signals by actuating an appropriate control key on keyboard 22 that a card in receiver select code generator 21 is to be read to provide a signal on control line 61 and on control line 27. These control signals effect the reading and switch data selectors 25 and 26 into the condition for transmitting data from the B inputs to condition the system for producing a receiver-select code. A control signal on line 62 enables 12-bit binary to ASCII-coded decimal sequence converter to convert the address code into ASCII form that is transmitted by data selector 26 to alphanumeric printer 23 for printing upon receipt of a print signal on line 63 from keyboard 22.

Keyboard 22 also provides a data ready signal on line 64 that sets flip-flops 48 and 57 to establish shift registers 31, 32 and 33 in the parallel mode and to enable divider 46 and counter 55 so that several parallel clock pulses occur on line 34 during the parallel mode to insure that data shift register 31 accepts the address code and inverse data shift register 32 accepts the inverse of the address code while clock shift register 36 accepts a ONE only in the second cell from the output.

A reset pulse from line 47 of frequency divider 46 resets mode flip-flop 48 to restore the shift registers to the serial mode and cause clock pulse selector 54 to emit serial clock pulses at a 100 Hz rate on line 34.

Meanwhile dividers 46 and 55 remain enabled. The output pulses from divider 46 are zero for the first half and ONE for the second half of a pulse period. Since shift registers 31, 32 and 33 are typically actuated by the positive-going transition of clock pulses, the first serial shift occurs at one half the usual time between serial shifts which sould make the duration of the first bit one half the duration of succeeding bits. This potential problem for receiver logic design is avoided by loading a ZERO in the first cell of each of the shift registers as indicated above.

Fourteen serial time slots are required for the twelve-bit receiver select code plus the timing bit and the initial bit that is always ZERO. The control signal on line 27 of data selector 56 enables input B to provide a reset pulse to control flip-flop 57 for resetting dividers 46 and 55 after 14 serial shifts of shift registers 31, 32, and 36.

The result is a tone sequence transmitted to the transmitter following the data ready signal from keyboard 22 for a receiver-select code that is nothing for the first half period, a timing tone from timing tone generator 43 for the next clock pulse period and sequences of data and inverse data tones as determined by the binary number sequence from tone generators 41 and 42 for the next twelve clock pulse periods followed by a period of no tone until the operator commences sending the message from the keyboard.

Transmission of a message selected at keyboard 22 is substantially the same as just described except that the selectors 25, 26 and 56 accept the signals on the A inputs; the first six bits of the data and inverse data shift registers are according to the ASCII code for the keyboard symbol, the printer input is taken from the keyboard output via data selector 26, and flip-flop 57 is reset after eight serial shifts instead of the fourteen required for transmission of the address code data. The last keyboard entry is an end of message code to signify that the message is ended.

Figure 3:
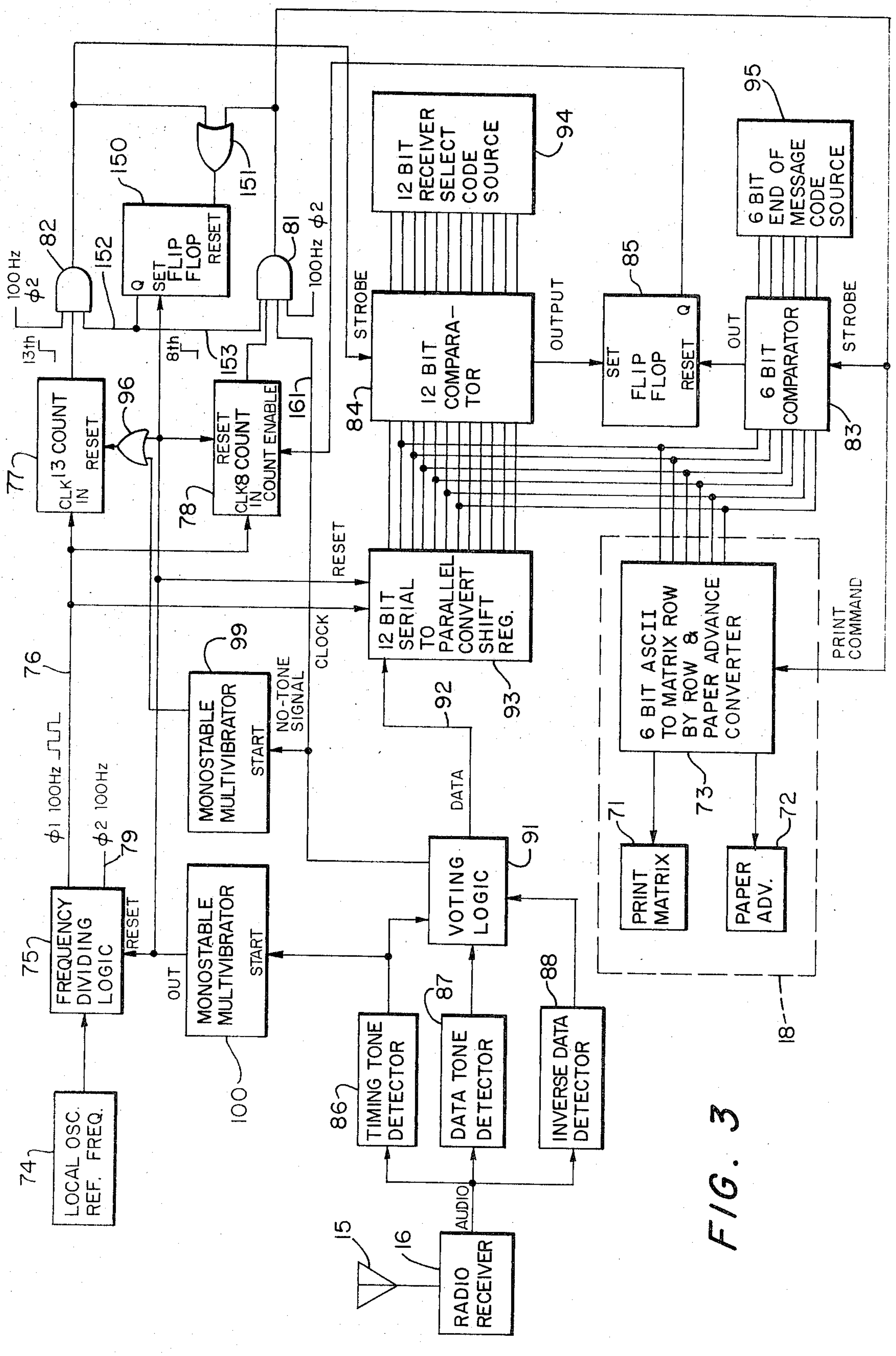
FIG. 3 is a block diagram illustrating the logical arrangement of a preferred means for processing the received information according to the invention.

Referring to FIG. 3, there is shown a block diagram illustrating the logical arrangement of a receiving system according to the invention. Printer and electronics 18 comprises a thermal print matrix 71, a paper advance 72 and a six-bit ASCII to matrix row-by-row and paper advance converter 73. The remaining apparatus, except for receiving antenna 15 and receiver 16, comprise the decoder logic 17. This apparatus comprises a local oscillator reference frequency source 74 for providing a frequency substantially the same as that provided by oscillator 45 at the transmitting end for energizing frequency dividing logic 75. The latter, when enabled, provides 100 Hz phase one clock pulses on line 76 and phase two clock pulses of the same frequency slightly later on line 79.

The clock pulses on line 76 activate counter 77 (13-count) and in the presence of a count enable input from the flip-flop 85 they activate counter 78 as well. In the presence of a strobe enable on lines 152 and 153 from flip-flop 150 the outputs of counters 77 and 78 enable every 13th and every 8th, respectively, phase 2 clock pulse presented to AND gates 82 and 81, respectively. The trailing edge of a strobe pulse from either AND gate 81 or 82 causes flip-flop 150 to reset, disabling both AND gates 81 and 82 subsequent to the strobe pulse. The phase 2 strobe signals to both the 12-bit comparator 84 and 6-bit comparator 83 are thereby disabled until the next timing tone activates monostable multivibrator 100 which generates reset signals setting counters 77 and 78 to zero, resetting all cells of shift register 93 to zeros, and setting flip-flop 150 to enable AND gates 81 and 82. Counter 78 (8-count) is additionally disabled until a received receiver-select code compares identically with the one supplied by receiver-select code source 94, and flip-flop 85 is set.

Timing tone detector 86, data tone detector 87 and data tone detector 88 detect timing, data and inverse data tones, respectively, of frequencies provided by timing tone generator 43, data tone generator 41 and inverse data tone generator 42, respectively, to energize voting logic 91 that provides a data signal on line 92 indicative of the appropriate binary bits for entry into the serial input of the 12-bit serial-to-parallel shift register 93 as the clock pulse input is energized by the clock pulses from line 76. Shift register 93 thus comprises input register means for receiving the detected tones and for storing each digital address word and message word one-by-one as the words are received. The twelve parallel output lines are connected to 12-bit comparator 84, the other twelve inputs of the latter being connected to the 12-bit receiver-select code source 94 uniquely identifying the receiver. Comparator 84 and receiver-select code source 94 comprise address decoding means coupled to the input register means for providing an identity signal when the input register means then stores an address word identifying that receiving system for receiving the message carried by the digital message words immediately following. The 2nd through 7th parallel output lines are also connected to the six input lines of six-bit ASCII to matrix row-by-row and paper advance converter 73 and to six of the inputs of six-bit comparator 83. Six-bit ASCII to matrix row-by-row and paper advance converter 73 comprises message decoding means coupled to the input register means for decoding each digital message word as it is stored in the input register means when enabled. The other six inputs of six-bit comparator 83 are connected to a six-bit end-of-message code source 95. Six-bit comparator 83 and six-bit end-of-message code source 95 comprise means coupled to the input register means responsive to the end-of-message signal for disabling the message decoding means. Apparatus including flip-flop 85, counter 78 and AND gate 81 comprise means responsive to the identity signal for enabling the message decoding means by providing the PRINT COMMAND signal and for interrupting that signal to disable the message decoding means in response to the end-of-message signal.

Having described the interconnections among the different elements of the system of FIG. 3, its mode of operation will be described. In the quiescent state the decoder logic examines each string of data to determine first whether the data string is 12 or six bits long in order to distinguish between receiver-select code and message data, respectively. Upon determining that a word is 12 bits long, the receiver decoder logic determines whether the particular select code corresponds to the one provided by source 94 identifying that receiver.

Each timing tone pulse resets the frequency dividing logic 75 to correct the phase of the local 100 Hz phase one clock pulses to correspond to that of the transmitted data. Each timing tone pulse also resets both 13-count counter 77 and 8-count 78 to a count of zero and sets flip-flop 150 to enable AND gates 81 and 82. If a period in which no tones are modulated upon the carrier follows the seventh data space, the voting logic 91 signals via monostable multivibrator 99 and OR gate 96 to reset 13-count counter 78 to zero, thereby signalling receipt of a six-bit message which could not be a receiver select code.

However, upon the occurrence of 13 consecutive clock pulses on line 76 following a timing tone, counter 77 provides an output signal that strobes 12-bit comparator 84 with the phase two clock pulse on the other leg of gate 82 to determine if the received code then stored in register 93 corresponds to that provided by 12-bit receiver select code source 94. If there is no match, the 13-count counter 78 will be reset to zero in response to the period of absence of tone modulation in preparation for the next sequence of data bits.

If the 12-bit address code matches, 12-bit comparator 84 provides an output that sets flip-flop 85 to enable 8-count counter 78 which will provide a strobe pulse at the output of gate 81 and thereby cause six-bit ASCII to matrix row-by-row and paper advance converter to print the character corresponding to the next code received.

As the character strings following the proper receiver-select code are entered into the shift register 93, the voting logic 91 is monitoring them. If after the seventh data bit the voting logic detects the presence of an eighth data bit, the character string must be a receiver-select code and should not be printed. The lack of an enabling signal on line 161 inhibits the strobe-print pulse otherwise emitted by AND gate 81. If the voting logic does detect the absence of all tones in the eighth interval, the data string must be a message character and should be printed. The no-tone signal that results on line 161 enables gate 81 which passes the strobe pulse to the ASCII to matrix converter 73 causing it to print and advance the paper. This printing is repeated until the end of message code resides in shift register 93. Six-bit comparator 83 then detects this code as being identical to that provided by six-bit end of message code source 95 and produces an output pulse that resets flip-flop 85 to disable the 8-count counter 78. The six-bit ASCII to matrix row-by-row converter may be configured to ignore the end of message code so that no character is printed or an end of message symbol may be printed.

Voting logic 91 determines the level which should be provided on data output line 92. The occurrence of an output from data tone detector 87 and nothing from inverse data detector 88 signifies that binary ONE should be provided. The occurrence of an output from inverse data detector 88 and nothing from data tone detector 87 signifies that binary ZERO should be provided. The occurrence of nothing from all tone detectors signifies that an end-of-bit-string signal is to be provided on line 161. While not specifically shown, the occurrence of any other condition can designate error or uncertainty. Alternately, the invention will operate with only a data tone detector, inverse data detector 88 being absent.

A feature of the invention is the reliability and low power consumption while monitoring for messages. Very little power is required for the receiving and monitoring functions. And the printer and associated electronics 18 are only activated when there is a message for that receiver.

Figure 4:
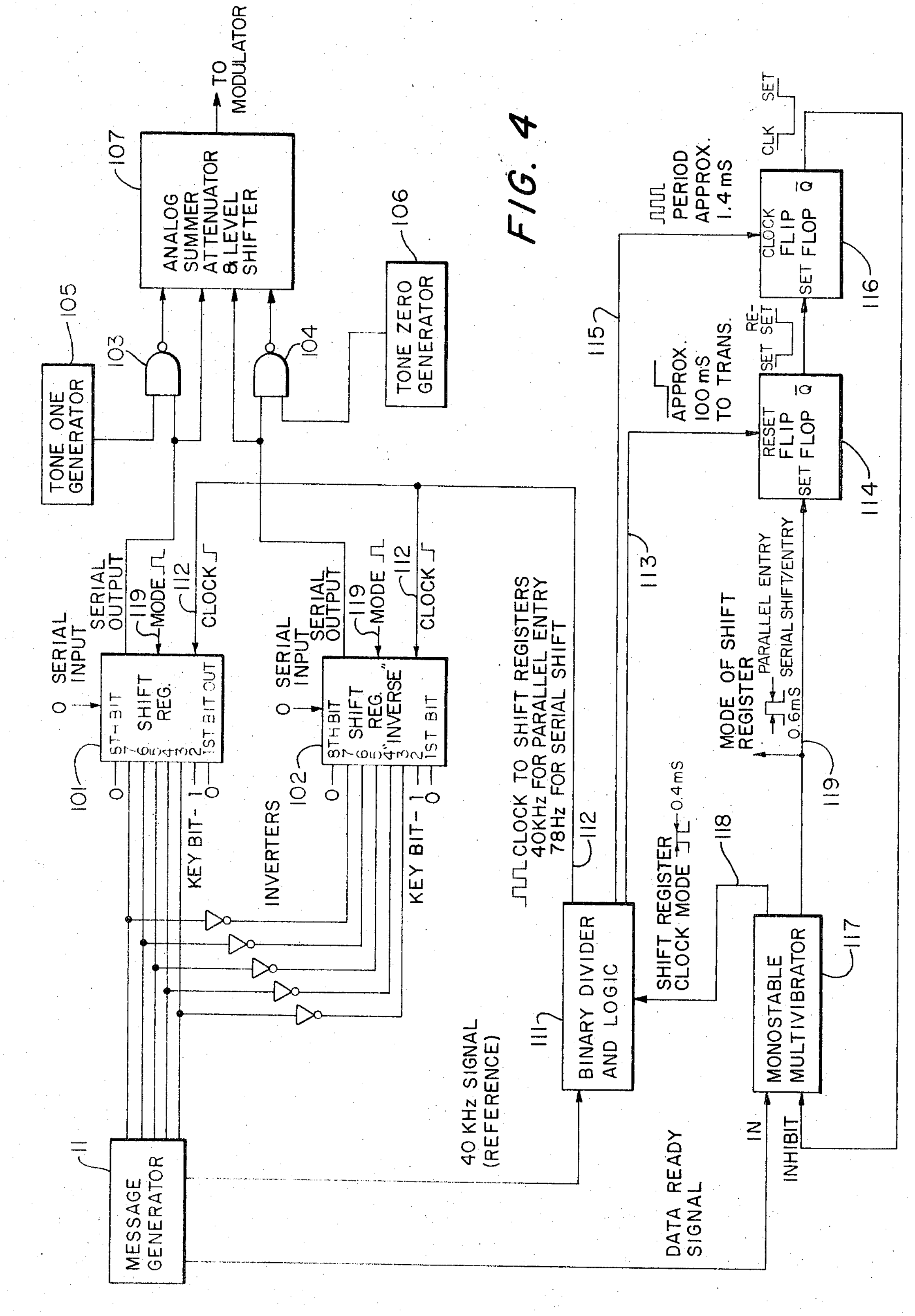
FIG. 4 is a block diagram illustrating the logical arrangement of another embodiment of the invention for providing tone signals to the transmitter.

Referring to FIG. 4, there is shown an alternate embodiment of the encoder logic 12. In this embodiment message generator 11 provides five parallel bits representative of a number for delivery to the third through seventh positions of a data shift register 101 and, after inversion through inverters, to an inverse data shift register 102. The first two bits of these registers are ZERO and ONE, respectively, while the eighth bit is ZERO. These registers also have mode inputs for receiving parallel mode and serial mode signals and clock pulse inputs. Each has a serial output for enabling respective tone output gates 103 and 104 to transmit a ONE tone from tone generator 105 and a ZERO tone from tone generator 106, respectively. The outputs of gates 103 and 104 are coupled to analog summer, attenuator, and level shifter 107 to provide first and second tones redundantly representative of the message to be transmitted.

The control circuitry includes binary divider and logic 111 that receives a 40 kHz reference signal from message generator source 11 to provide clock pulse signals on line 112 of 40 kHz for parallel entry and 78 Hz for serial shift to the clock pulse inputs of registers 101 and 102. Binary divider and logic 111 also provides pulses on lines 113 and 115 to flip-flops 114 and 116, respectively, to provide an inhibiting signal that prevents monostable multivibrator 117 from responding to a second data ready pulse between 0.7 mSec and 100 milliseconds after an initial data ready signal. Monostable multivibrator 117 is triggered by a data ready signal from the message generator 11 to provide signals on line 118 changing the frequency of the shift register clock pulses for 0.4 milliseconds and on line 119 establishing the parallel entry mode for about 0.6 milliseconds and thereafter the serial shift mode. The signal on line 119 also sets flip-flop 114 which sets flip-flop 116, thereby inhibiting further data ready signals for at least 100 milliseconds.

Figure 5:
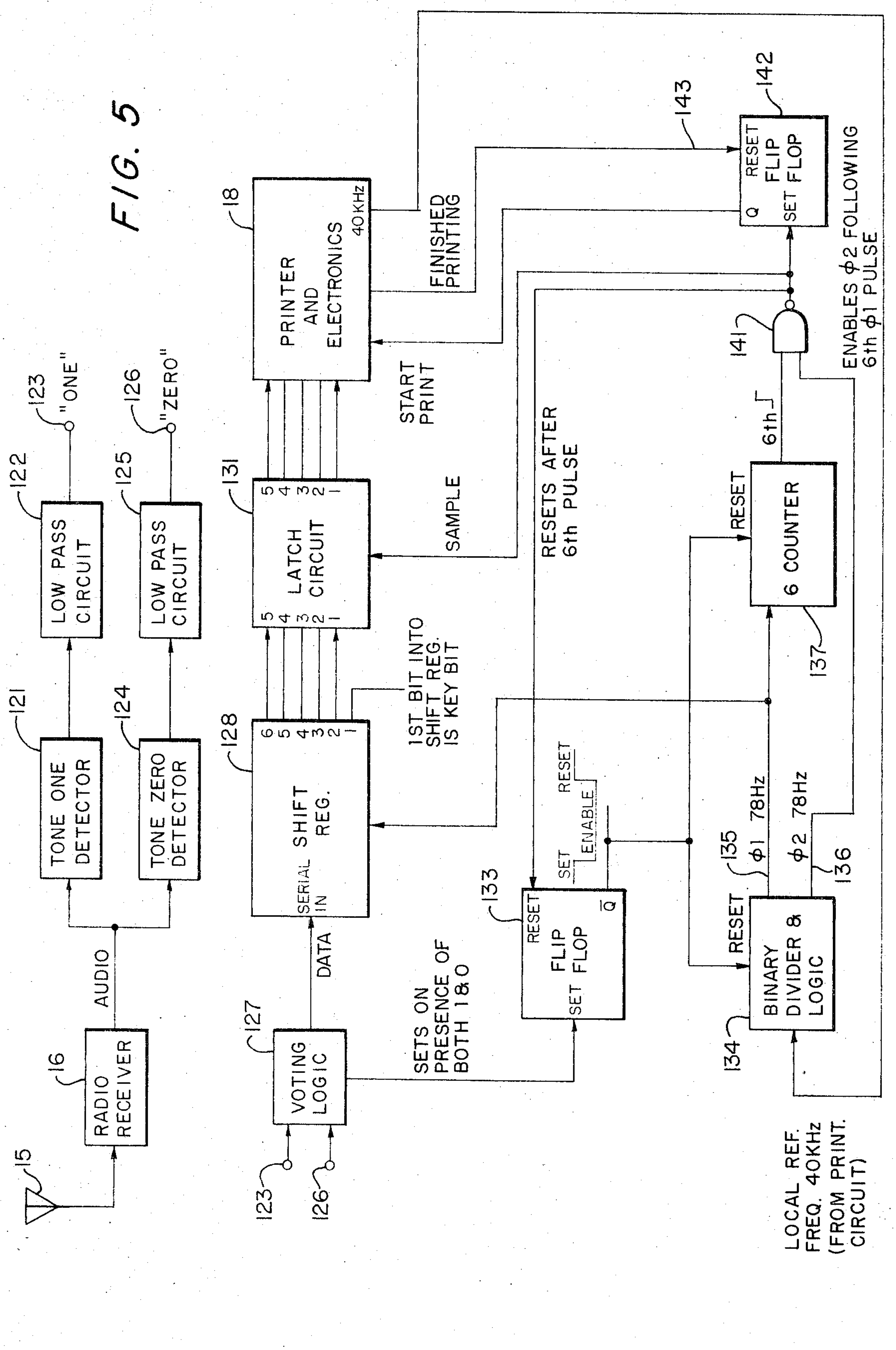
FIG. 5 is a block diagram illustrating an embodiment of the invention for utilizing at the receiver the information provided by the system of FIG. 4.

Referring to FIG. 5 there is an alternate arrangement of the decoder logic 17 in association with printer and electronics 18 and radio receiver 16. A tone one detector 121 and following low-pass circuit 122 provide a ONE signal on output terminal 123. Similarly, a tone zero detector 124 and following low-pass circuit 125 provide a ZERO signal on line 126. The voting logic 127 provides a set signal to flop-flop 133 in the presence of signals simultaneously on lines 123 and 126. It provides a ZERO at the serial input of shift register 128 in the simultaneous presence of a signal on line 126 and absence of signal on line 123; a ONE in the presence of a signal on line 123 and absence of signal on line 126; a ONE in the simultaneous presence or absence of tones on both lines 123 and 126 as data error signal. The first bit into shift register 128 is key bit with the second through sixth bits being representative of the transmitted character. These five bits are stored by latch circuit 131 which transfers the data to printer and electronics 18 to designate a character to be printed. A 40 kHz signal from printer and electronics 18 is applied to binary divider logic 134 to provide phase one clock pulses on line 135 and phase two clock pulses slightly later on line 136. The phase one clock pulses are applied to the clock input of shift register 128 and to a six-counter 137 that enables gate 141 to transmit a phase 2 clock pulse following the 6th phase one clock pulse for energizing the sample input of latch circuit 131 and set flip-flop 142 to effect the start of printing. Flip-flop 142 is reset when printing is finished and signified by the signal on line 143. Flip-flop 133 is reset by the output of gate 141 and resets binary divider and logic 134 and six-counter 137, thereby terminating both phase one and phase two clock pulses. The latch circuit 131 comprises means for holding the code for printing one character while the next character to be printed is arriving.

While hard copy is the preferred form of storing the message, it is within the principles of the invention to receive the message in an appropriate storage medium, such as a storage register and include means for selectively recalling the stored message information and displaying it on an appropriate visible display, such as LED, liquid crystal or other suitable display.

The preferred form of storage comprises a 5 × 5 thermal matrix printer of a type known in the art, and details of such a printer have been omitted herein.

A feature of the invention is that it is suitable for conveying a common message to multiple addresses. The receiver select codes for the desired receivers may be sequentially transmitted to activate the decoding circuits of the appropriate receivers. The encoding and decoding logic and the transmitted code are configured so that reception of a receiver select code subsequent to activation causes no printing; only a legitimate message code causes printing. When all of the called receivers are activated the message is simultaneously broadcast to these receiving units.

The encoding logic does not require the interjection of an end-of-message signal between receiver-select codes; any number of receiver-select codes may be transmitted before a message text is sent.

Referring to FIG. 3 of the drawing, once a receiver has been activated by reception of its own receiver-select code it activates its 8-count counter 78. The 8-count counter 78 allows the shift register 93 to clock in the timing bit and six of the subsequent data bits plus one additional serial shift, and then provides a strobe pulse for the ASCII-to-matrix row-by-row converter 73. The strobe pulse to the ASCII-to-matrix row-by-row converter 73 is enabled only if the voting logic 91 detects the absence of all tones in the eighth period and sends out a no tone signal which enables gate 81 to pass the strobe-print signal.

If the voting logic does sense either a ONE or a ZERO tone in the eighth time space, the no-tone signal is not generated, gate 81 is not enabled to pass a strobe-print signal and the 6-bit ASCII-to-matrix row-by-row converter 73 is not strobed. The presence of a ONE or ZERO tone in the eighth time space ordinarily signifies that an address code is being transmitted.

An audible alarm may be included in the receiver to alert the user when immediate action is required in response to an incoming message. The decoding circuit of FIG. 3 may be modified to include a comparator similar to comparator 83 for monitoring the 6-bit ASCII code, as received from the transmitter, for a predetermined alarm code. Once the alarm code is received a latch may be set holding the alarm on for either a time determined by a timing circuit in the receiver or until the end of message code is received which would then disable the decoder and alarm sections of the receiver. Specific apparatus for embodying this function is within the skill of a person of ordinary skill in the art from examining this specification.

There has been described novel apparatus and techniques for paging a person without disturbing him, providing a record of the message that can be examined when convenient for the person and in a manner that facilitates low power consumption with a compact lightweight receiver circuit. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A personal paging system comprising, a source of digital message signals at a first location, a source of digital address signals at said first location identifying a recipient of a message, means for characterizing said digital address and message signals as a sequence of audio tones, means for transmitting said tones upon a radio frequency carrier with the address signal tones preceding the message signal tones, a personally transportable receiving system including means for receiving said radio frequency carrier and detecting said tones at a second location remote from said first location, input register means for receiving the detected tones and for storing each digital address word and message word one-by-one as the words are received, address decoding means coupled to said input register means for providing an identity signal when the input register means then stores an address word identifying that receiving system for receiving the message carried by the digital message words immediately following, message decoding means coupled to said input register means for decoding each digital message word as it is stored in said input register means when enabled, means responsive to said identity signal for enabling said message decoding means to provide a sequence of decoded digital message word signals representative of said message, means for storing said decoded digital message signals and reproducing them in visible form identifiable as alphanumeric characters, a source of an end of message signal in digital form at said first location, means for transmitting said end of message signal after said message signals, and means coupled to said input register means responsive to said end-of-message signal for disabling said message decoding means.

2. A personal paging system in accordance with claim 1 wherein said sources of address and message signals comprise means for providing digital word signals including means for establishing each address digital word signal longer than each digital message word signal.

3. A personal paging system in accordance with claim 2 wherein said receiving system includes means responsive to the length of a received digital word signal for distinguishing between address word signals and message word signals and identifying the longer word signals as address signals and the shorter word signals as message signals.

4. A personal paging system in accordance with claim 3 wherein said receiving system includes, said input register means at said second location having storage cells sufficient to store each bit of an address word signal for storing the most recently received one of address and message words, said address decoding means including a source of a digital select code signal at said second location for identifying a recipient associated with said second location and address comparing means for comparing the signal stored in said input register means with said digital select code signal to provide said identity signal when the two are the same, thereby indicating that message signals to follow are for storing at said second location, said means for storing said digital message signals and reproducing them in visible form including output storage and display means at said second location for storing and visually displaying message signals only when enabled, means responsive to said identity signal for enabling said output storage and display means, and means for coupling said input storage means to said output storage and display means to store in response to said identity signal received message signals as they arrive at said second location.

5. A personal paging system in accordance with claim 4 and further comprising a source of an end-of-message digital signal, end of message comparator means for comparing said end-of-message digital signal with the signal in said input storage means for providing a stop signal when the latter two are identical, and means for coupling said stop signal to said output storage and display means to uncouple the latter upon receipt of an end-of-message signal in said input storage means.

6. A personal paging system in accordance with claim 1 and further comprising a source of a timing tone signal, means for transmitting said timing tone signal a predetermined interval before the transmission of each digital word signal which interval is less than the time for transmitting each digital word, a source of a clock signal at said second location, means at said second location for detecting the transmitted timing tone, and means responsive to the detected timing tone for establishing the phase of said clock signal at said second location in synchronism with the occurrence of bit signals in the received digital word signals.

7. A personal paging system in accordance with claim 6 and including, a source of data and inverse data tones transmitted in mutually exclusive time intervals for characterizing the digital word signals and the complement of the digital word signals respectively, and voting logic means at said second location responsive to at least the detected data and inverse data tones for recognizing the occurrence of a valid word bit only when the occurrence of one of said data and inverse data tones is accompanied by the absence of the other.

8. A method of paging with the paging system of claim 1 which method includes the steps of transmitting from said first location first at least one digital address word signal designating an intended recipient followed by at least one digital message word signal intended for said intended recipient, receiving and storing in said input register means at said second location first said address signal and then the following digital message signals, decoding at said second location the received address signal then in said input register means to provide an identity signal when that address signal designates a recipient thereat for reception of a message signal to follow, and transferring at least one following message signal to said means for storing in response to said identity signal to store and visually display the message word represented by the message signal.

9. A method of paging in accordance with claim 8 wherein the storing and visually displaying step includes printing said at least one message signal.

10. A personal paging system in accordance with claim 1 wherein said means for storing and reproducing includes means for printing said digital message signals.

11. A personal paging system in accordance with claim 1 wherein said source of digital address signals at said first location includes a source of digital address signals each identifying a plurality of recipients for a common message, and said means for transmitting includes means for transmitting a common message transmission by transmitting first the tones characterizing the latter digital address signals each identifying a plurality of recipients for said common message and then transmitting only once the tones characterizing the digital message signals representative of said common message.

12. A personal paging system in accordance with claim 11 wherein said receiving system includes means for discriminating between address signals and message signals for storing and reproducing in visible form only said message signals.

13. A personal paging system in accordance with claim 5 and further comprising, a source of a timing tone signal, means for transmitting said timing tone signal a predetermined interval before the transmission of each digital word signal which interval is less than the time for transmitting each digital word, a source of a clock signal at said second location, means at said second location for detecting the transmitted timing tone, and means responsive to the detected timing tone for establishing the phase of said clock signal at said second location in synchronism with the occurrence of bit signals in the received digital word signals.

14. A personal paging system in accordance with claim 13 wherein said source of a clock signal and said means responsive to the detected timing tone comprises, a source of a local oscillator signal, frequency dividing logic means energized by said local oscillator signal for providing a clock pulse in response to a predetermined number of periods of said local oscillator signal, and a first monostable multivibrator energized by each detected timing tone for then providing a reset signal to said frequency dividing logic means to restore the count thereof to a predetermined initial count.

15. A personal paging system in accordance with claim 14 wherein said receiving system includes means for discriminating between address signals and message signals for storing and reproducing in visible form only said message signals and said frequency dividing logic means provides phase two clock pulses occurring in the interval between successive ones of said clock pulses, said means for discriminating including, a first counter energized by said clock pulses for providing an assertion signal after a first predetermined number of said clock pulses, a second normally disabled counter energized by said clock pulses for providing an assertion signal after a second predetermined number of said clock pulses which second number is less than said first number, means responsive to the occurrence of the first counter assertion signal and a phase two clock pulse for providing a strobe pulse to then provide said identity signal, said means responsive to said identity signal comprising an identity flip-flop set by said identity signal for enabling said second counter, and means responsive to the occurrence of the second counter assertion signal, a phase two clock pulse and the absence of a detected tone for providing a strobe pulse for enabling the means for coupling said input storage means to said output storage and display means to store received message signals as they arrive and for enabling said end-of-message comparator means to provide a stop signal for resetting said identity flip-flop upon the occurrence of a stop signal.

16. A personal paging system in accordance with claim 15 and including, a source of data and inverse data tones transmitted in mutually exclusive time intervals for characterizing the digital word signals and the complement of the digital word signals respectively, voting logic means at said second location responsive to at least the detected data and inverse data tones for recognizing the occurrence of a valid word bit only when the occurrence of one of said data and inverse data tones is accompanied by the absence of the other for delivering corresponding data bit signals to said input storage means and providing a no-tone signal upon the absence of said timing, data and inverse data tones, and a second monostable multivibrator set in response to the absence of said tones for resetting set first counter upon the occurrence of said first monostable Multivibrator being set.

17. A personal paging system in accordance with claim 16 wherein said input register means comprises a shift register having as many storage cells as address digital word bits for receiving both address word signals and message word signals in serial form with parallel lines from each of the latter storage cells to said address comparing means and a contiguous group of less than all of said parallel lines also coupled to said end-of-message means for comparing and to said output storage and display means.

18. A personally transportable receiving system for use with a transmitter that transmits digital message signals, digital address signals and a digital end of message signal as a sequence of audio tones upon a radio frequency carrier in the sequence of address signal tones, message signal tones and end of message signal tones comprising, means for receiving said radio frequency carrier and detecting said tones, input register means for receiving the detected tones and for storing each digital address word and message word one-by-one as the words are received, address decoding means coupled to said input register means for providing an identity signal when the input register means then stores an address word identifying that receiving system for receiving the message carried by the digital message words immediately following, message decoding means coupled to said input register means for decoding each digital message word as it is stored in said input register means when enabled, means responsive to said identity signal for enabling said message decoding means to provide a sequence of decoded digital message word signals representative of said message, means for storing said digital message signals and reproducing them in visible form identifiable as alphanumeric characters, and means coupled to said input register means responsive to said end of message signal for disabling said message decoding means and enabling said address decoding means.

19. A personally transportable paging receiving system in accordance with claim 18 wherein said address and message signals comprise digital word signals with each address digital word signal longer than each digital message word signal and further including means responsive to the length of a received digital word signal for distinguishing between address word signals and message word signals and identifying the longer word signals as address signals and the shorter word signals as message signals.

20. A personal paging system in accordance with claim 19 wherein said input register means has storage cells sufficient to store each bit of an address word signal for storing the most recently received one of address and message words, and further cOmprising a source of a digital select code signal, address comparing means for comparing the signal stored in said input storage means with said digital select code signal to provide an identity signal when the two are the same, thereby indicating that message signals to follow are for storing, output storage and display means for storing and visually displaying message signals only when enabled, means responsive to said identity signal for enabling said output storage and display means, and means for coupling said input register means to said output storage and display means to store in response to said identity signal received message signals as they arrive at said receiving system.

21. A personal paging system in accordance with claim 20 and further comprising a source of an end-of-message digital signal, end of message comparator means for comparing said end-of-message digital signal with the signal in said input register means for providing a stop signal when the latter two are identical, and means for coupling said stop signal to said output storage and display means to uncouple the latter upon receipt of an end-of-message signal in said input storage means.

22. A personal paging system in accordance with claim 18 wherein said system includes means for discriminating between address signals and message signals for storing and reproducing in visible form only said message signals.

23. A personal paging receiving system in accordance claim claim 22 and further comprising, a source of a local oscillator signal, frequency dividing logic means energized by said local oscillator signal for providing a clock pulse in response to a predetermined number of periods of said local oscillator signal, a first monostable multivibrator energized by detected timing tones which timing tones originate at said transmitter for then providing a reset signal to said frequency dividing logic means to restore the count thereof to a predetermined initial count, said frequency dividing logic means including means for providing phase two clock pulses occurring in the interval between successive ones of said clock pulses, said means for discriminating including, a first counter energized by said clock pulses for providing an assertion signal after a first predetermined number of said clock pulses, a second normally disabled counter energized by said clock pulses for providing an assertion signal after a second predetermined number of said clock pulses which second number is less than said first number, means responsive to the occurrence of the first counter assertion signal and a phase two clock pulse for providing a strobe pulse to then provide said identity signal, said means responsive to said identity signal comprising an identity flip-flop set by said identity signal for enabling said second counter, and means responsive to the occurrence of the second counter assertion signal, a phase two clock pulse and the absence of a detected tone for providing a strobe pulse for enabling the means for coupling said input register means to said output storage and display means to store received message signals as they arrive and for enabling said end-of-message comparator means to provide a stop signal for resetting said identity flip-flop upon the occurrence of a stop signal.

24. A personal paging system in accordance with claim 23 and including, a source of data and inverse data tones received in mutually exclusive time intervals for characterizing the digital word signals and the complement of the digital word signals respectively, voting logic means at said receiving means responsive to at least the detected data and inverse data tones for recognizing the occurrence of a valid word bit only when the occurrence of one of said data and inverse data tones is accompanied by the absence of the other for delivering corresponding data bit signals to said input register means and providing a no-tone signal upon the absence of said timing, data and inverse data tones, and a second monostable multivibrator set in response to the absence of said tones for resetting set first counter upon the occurrence of said first monostable multivibrator being set.

25. A personal paging system in accordance with claim 24 wherein said input register means comprises a shift register having as many storage cells as address digital word bits for receiving both address word signals and message word signals in serial form with parallel lines from each of the latter storage cells to said address comparing means and a contiguous group of less than all of said parallel lines also coupled to said end-of-message means for comparing and to said output storage and display means.

* * * * *